United States Patent
Smith et al.

(10) Patent No.: US 7,050,041 B1
(45) Date of Patent: *May 23, 2006

(54) POINTING DEVICE WITH A CABLE STORAGE WINDING MECHANISM

(75) Inventors: David L. Smith, Corvallis, OR (US); Memphis Zhihong Yin, Corvallis, OR (US); Michael D. Derocher, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 877 days.

This patent is subject to a terminal disclaimer.

(21) Appl. No.: 09/699,792

(22) Filed: Oct. 30, 2000

(51) Int. Cl.
*G09G 5/50* (2006.01)

(52) U.S. Cl. .................. 345/156; 345/163; 345/166; 463/37

(58) Field of Classification Search ............... 345/156, 345/157, 166, 175, 162, 163, 160; 700/17, 700/83, 84, 85; 463/37, 38, 39, 40
See application file for complete search history.

(56) References Cited

U.S. PATENT DOCUMENTS

| | | | | |
|---|---|---|---|---|
| 3,430,886 A | | 3/1969 | Sweeney ................. 242/118.7 |
| 4,802,638 A | | 2/1989 | Burger et al. ............. 242/85.1 |
| 5,042,159 A | | 8/1991 | Millen ........................ 33/414 |
| 5,522,691 A | * | 6/1996 | Anderson et al. ........... 414/325 |
| 5,600,719 A | | 2/1997 | Lovecky et al. ............ 379/438 |
| 5,672,847 A | * | 9/1997 | Piatt ............................ 174/135 |
| 5,760,766 A | | 6/1998 | Auber et al. ................ 345/167 |
| 5,828,364 A | | 10/1998 | Siddiqui ..................... 345/163 |
| 5,861,873 A | * | 1/1999 | Kikinis ....................... 345/157 |
| 5,914,702 A | | 6/1999 | Derocher et al. ........... 345/157 |
| 5,920,306 A | * | 7/1999 | Kikinis ....................... 345/158 |
| 5,944,292 A | * | 8/1999 | Roman ........................ 248/200 |
| 5,980,450 A | * | 11/1999 | Thompson .................. 600/112 |
| 5,992,787 A | | 11/1999 | Burke ........................ 242/388.1 |
| 6,020,875 A | * | 2/2000 | Moore et al. ............... 345/156 |
| 6,088,021 A | * | 7/2000 | Yong .......................... 345/163 |
| 6,166,722 A | * | 12/2000 | Kawabe et al. ............. 345/169 |
| 6,400,353 B1 | * | 6/2002 | Ikehara et al. .............. 345/157 |
| 6,529,620 B1 | * | 3/2003 | Thompson .................. 382/141 |

(Continued)

FOREIGN PATENT DOCUMENTS

JP 9307982 11/1997
NL 1003471 C 7/1995

OTHER PUBLICATIONS

Mouse With No Tail (sku: w024-2); http://www.shapenet.com.

(Continued)

*Primary Examiner*—Alexander Eisen
*Assistant Examiner*—Abbas Abdulselam
(74) *Attorney, Agent, or Firm*—Donald J. Coulman (57) ABSTRACT

A pointing device, which is capable of changing the appearance of a display, includes a housing made up of a cover and a base, a single spool cable receiver rotatably mounted to the housing, and a cable having a first end and a second end with the second end mounted to the cable receiver. The pointing device has a first mode with a first portion of the cable having a first length external to the pointing device and a second portion of the cable wound around the cable receiver. The pointing device also has a second mode with the first portion of the cable having a second length external to the pointing device less than the first length.

28 Claims, 10 Drawing Sheets

U.S. PATENT DOCUMENTS 6,600,479 B1 * 7/2003 Smith et al. .................. 345/163
6,623,433 B1 * 9/2003 Webler et al. ............... 600/467

OTHER PUBLICATIONS

SONY-MDR-E827G; http://www.sel.sony.com/SEL/consumer/ss5/portable/accessories/sportheadphones/index.shtml.

The Apple Store (U.S.); http://store.apple.com/ 1-800-MY-APPLE/WebObjects/AppleStore.woa/243/wo/RmUfS1QvetjDwgcJxp/3.5.0.3.28.1.

The Spider, 1999 Inventure(tm); www.web.connector http://www.inventured.com/index_spider.html.

How to Use Your New Shape Products-User Guide (Mouse With No Tail Kit); pp. 1-2; by: SHAPE-Shape Global Technology Inc.

* cited by examiner

POINTING DEVICE WITH A CABLE STORAGE WINDING MECHANISM

BACKGROUND OF THE INVENTION

This invention relates generally to pointing devices for an electronic device such as a computer, and more particularly to a manually controlled pointing device for generating data for pointing to such an electronic device. This data is typically used to change the appearance of a display screen. More particularly, the present invention relates to a pointing device having a windable cable storage mechanism within the housing of the mouse.

A computer mouse is a common pointing device used to generate signals for control of a cursor or reference point on a computer display. A computer mouse often includes one or more buttons or switches which can either be dedicated or programmed to correspond to a specific command function (e.g. "click" to select a display icon, "double click" to open the item associated with the display icon, display a menu item, or provide some custom function). A computer mouse, in addition, often includes a cable for transmitting signals to the display, typically via a computer. Other common pointing devices include a trackball, touchpad device, and a joystick. Each of these devices also controls the movement of a cursor on a computer display screen, and typically includes buttons for entering specific functions, and a cable for transmitting data to the microprocessor.

Portable computers, such as laptops, notebooks, hand held and palm top computers, have become quite popular. People are increasingly using portable computers while traveling. In most cases these portable computers contain one or more pointing devices such as, a built in mouse, or a touchpad device, or small joystick, commonly referred to as a pointing stick. Many users find these devices on portable computers to be less than optimal. The small size tends to make them very sensitive to movement, which creates difficulty in easily controlling the movement of the cursor compared to the size of a pointing device found with a desktop computer. They are also typically unfamiliar to desktop personal computer users. Therefore, many users carry a separate, full size computer mouse with them while traveling to use with the portable computer. This leads to the undesired effect of having to store the computer mouse in a carrying case, which takes up scarce space. Typically, the computer user winds the cable against itself in a more manageable length using a rubber band or tie to prevent the cable from unraveling. In other cases, the user simply wraps the cord around the computer mouse, again using a rubber band or tie to prevent the cable from unraveling or slipping off the computer mouse. Since many computer mice have rounded edges, corners, and gently sloping contours for ergonomic purposes, keeping a cable wrapped around a mouse is difficult. The use of a computer mouse in this manner leads to a bulky, cumbersome and unorganized object which is less than optimal when traveling. Further, this crude storage manner lends itself to dirt coming into contact with the cable connector during storage, which can result in interference with the connection or transmission of data.

Storage is not the only issue confronting computer users while traveling. Many users operate their computers, while traveling, in cramped and confined spaces such as during flights, on trains, or in hotel rooms. In these situations, the cord of a full size computer mouse can become easily entangled on another object, such as an airline seat tray, thus making the mouse difficult to operate.

To address these issues, Shape Technologies has recently introduced under the name "Mouse with no tail," a computer mouse which has a cable winding mechanism built into the mouse. This device utilizes a standard opto-mechanical tracking device along with two switches and a flat multi-wire unshielded cable. The cable winding mechanism in this device is a two-spool system requiring two distinct and separate spools mounted on top of each other with approximately equal lengths of cable. For example, three feet of cable external to the mouse requires approximately three feet of cable on the second spool remaining inside the mouse at all times. With the two spool system the limit in the length of wire which can be external to the mouse is determined by this second spool; that is, the longer the length of cable desired to be external to the mouse, the larger the second spool must be. Thus approximately half of the total volume available for storage is used by the length of cable that remains within the mouse body and is not available to the user. This can be quite disadvantageous where space is limited.

Figure 1A:
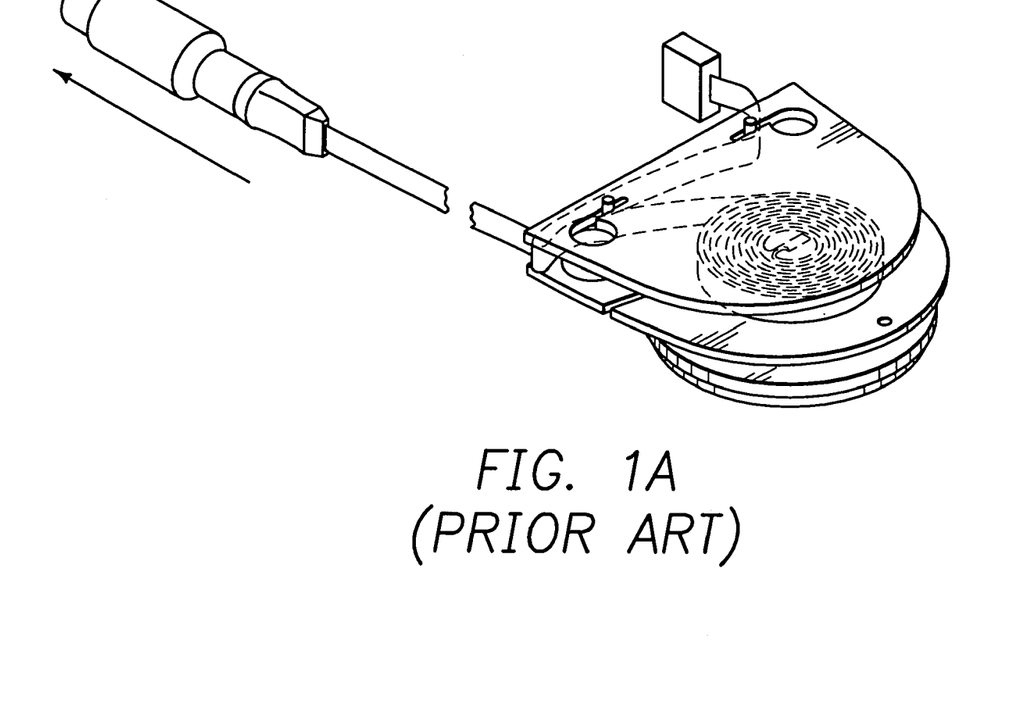
FIG. 1a is a perspective view of a prior art two spool system with the cable fully unwound.
Figure 1B:
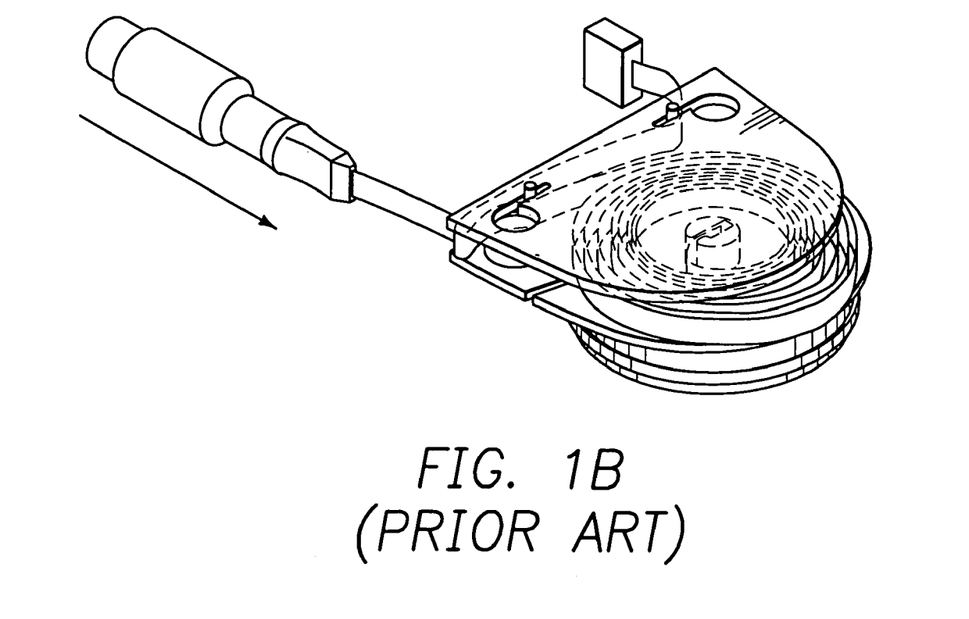
FIG. 1b is a perspective view of a prior art two spool system with the cable fully wound.

FIG. 1 shows a perspective view of a two spool system. FIG. 1a shows the lower spool with the cable fully unwound. In this state the upper spool is in its most tightly wound state. FIG. 1b shows the lower spool with the cable almost fully wound and the upper spool of cable is almost fully unwound. Another disadvantage of a two-spool system is that two sharp bends in the flat cable at approximately 90 degrees are used in order to connect the upper spool of cable to the lower spool of cable. This limits the type of cable that can be used and makes the cable more prone to breakage at this point.

Another disadvantage of this device is that the winding mechanism is accessed through the bottom of the mouse, which may result in the pick-up of dirt or lint during operation. This may make it difficult or impossible for the user to unwind the cable from the mouse or wind it back into the mouse, defeating the purpose of the cable winding mechanism, and perhaps rendering the mouse itself inoperable.

SUMMARY OF THE INVENTION

A pointing device, which is capable of changing the appearance of a display, includes a housing made up of a cover and a base, a single spool cable receiver rotatably mounted to the housing, and a cable having a first end and a second end with the second end mounted to the cable receiver. The pointing device has a first mode with a first portion of the cable having a first length external to the pointing device and a second portion of the cable wound around the cable receiver. The pointing device also has a second mode with the first portion of the cable having a second length external to the pointing device less than the first length.

DETAILED DESCRIPTION

Figure 2:
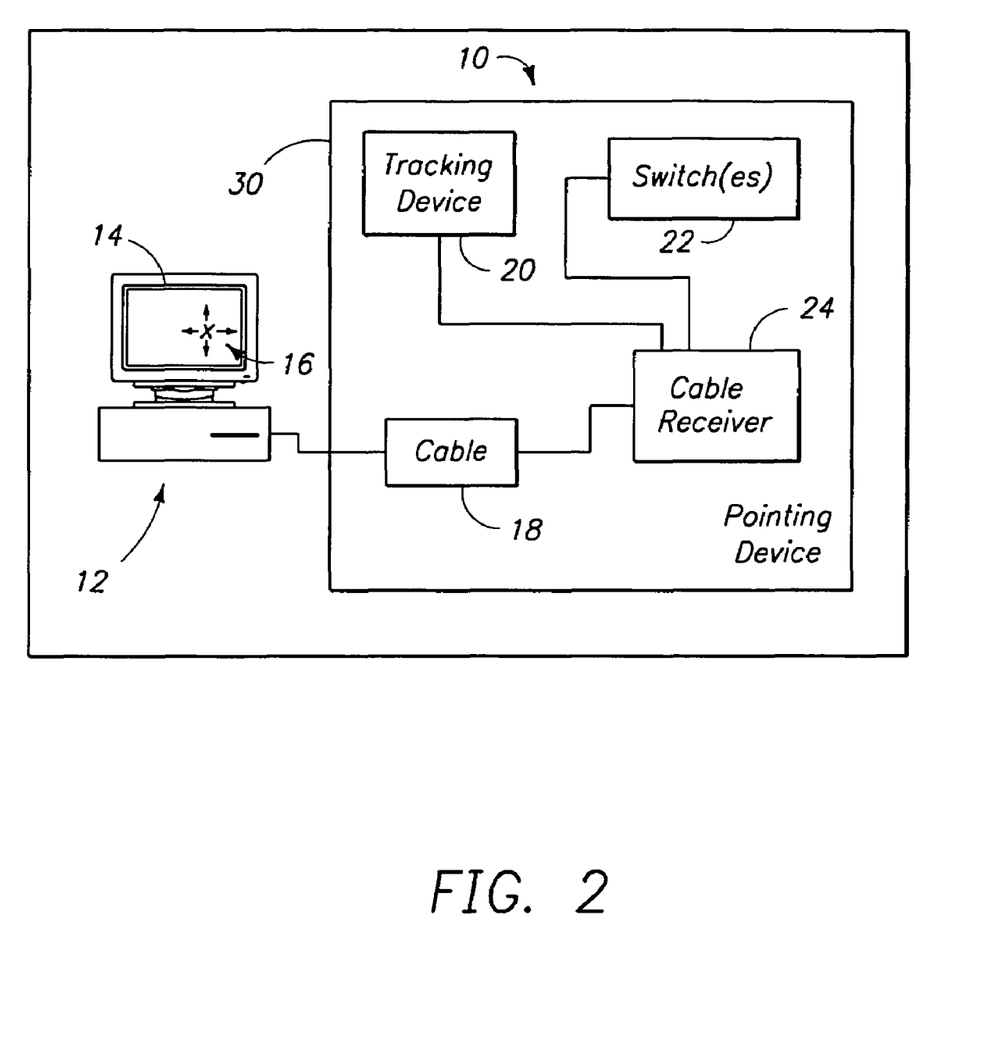
FIG. 2 is a diagram of a pointing device coupled to a display according to an embodiment of this invention.

Referring to FIG. 2 pointing device 10 is used with display 14 to control the movement of cursor 16 or other reference displayed on display 14. Pointing device 10 includes tracking device 20, one or more switches 22, and cable receiver 24, all contained within housing 30, and cable 18 providing a communication interface between pointing device 10 and display 14 typically via computer 12. Cable receiver 24 is rotatably mounted to housing 30. Switches 22 are preferably capacitively coupled to cable receiver 24 providing a rotatable non contact electrical connection to cable 18. Although other types of cable can be used, it is preferable that cable 18 is a shielded cable. Signals generated by tracking device 20 and switches 22 are sent to display 14 through the communication interface using a prescribed protocol. These signals can either be sent directly to display 14 if it contains a processor or other means capable of utilizing the signals, or indirectly via computer 12. Cable receiver 24 is formed to accept cable 18 by winding cable 18 about cable receiver 24. This provides a compact device capable of storing cable 18 without the need, for a rubber band or tie to keep cable 18 in place.

Typically, tracking device 20 consists of a mechanical, optomechanical, or optical detection system. In both mechanical and optomechanical tracking devices either a rubber or rubber coated ball is mounted inside housing 30 such that the ball protrudes slightly from the bottom surface of housing 30. The ball typically rests against two rollers perpendicular to each other with a third spring-loaded roller that captures the ball in place. In a mechanical system movement of the ball causes sensors to send electrical signals through cable 18 to either display monitor 14 or computer 12. In optomechanical systems light-emitting diodes (LEDs) coupled to phototransistors sense movement of the ball. Optical systems have no moving parts, and typically operate by determining the direction and magnitude of movement using either: a) LEDs (2 different colors, one for each orthogonal direction) and a special reflective pad containing gridlines (spacing for each orthogonal direction optimized for each LED color), by detecting motion using light detectors; or b) by using a system which measures changes in position by optically acquiring images (frames) and mathematically determining motion.

In one embodiment tracking device 20 is an optical system that includes a sensor, lens and LED assembly manufactured by Agilent Technologies of Palo Alto, Calif., part numbers HDNS-2000 (Sensor), HDNS 2100 (Lens), HDNS-2200 (LED Assembly Clip) and HLMP-ED80 (High Light Output red LED). This tracking system embodiment includes no moving parts and allows tracking of device movement over any surface. In particular, an optical tracking device is preferred over a mechanical or optomechanical device housing a captured ball, because an optical based system takes up considerably less space. Although other tracking devices can be used, it is preferable that the size of the tracking system be kept minimal to allow pointing device 10 to be stored in as small a volume as practical. In addition, it is also advantageous to minimize the tracking system size to maximize the room available for the storage of cable 18. Further, an optical based tracking device allows the pointing device to be used over non-planar surfaces, thus removing a limitation of many pointing devices, the requirement to use a generally planar pad.

Figure 3A:
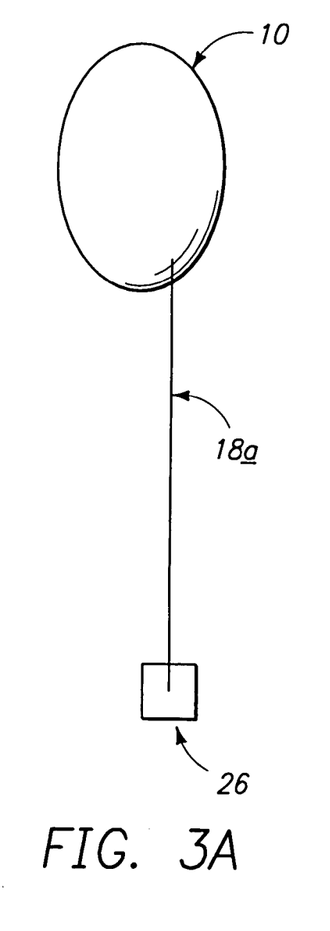
FIG. 3a is a diagram of a pointing device in a first mode according to an embodiment of this invention.
Figure 3B:
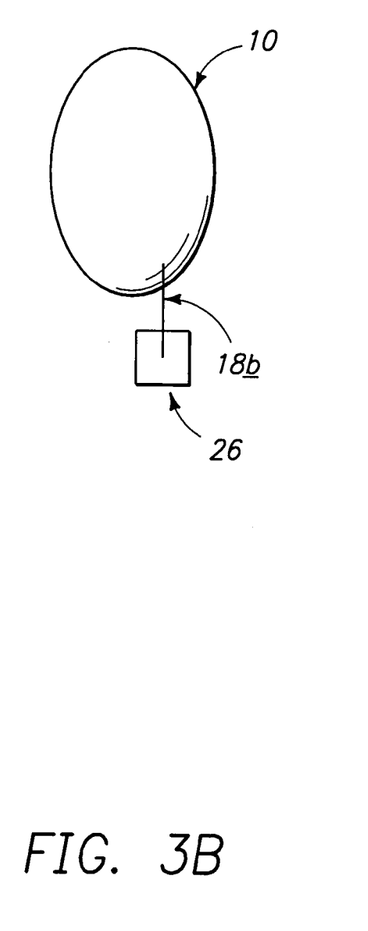
FIG. 3b is a diagram of a pointing device in a second mode according to an embodiment of this invention.
Figure 3C:
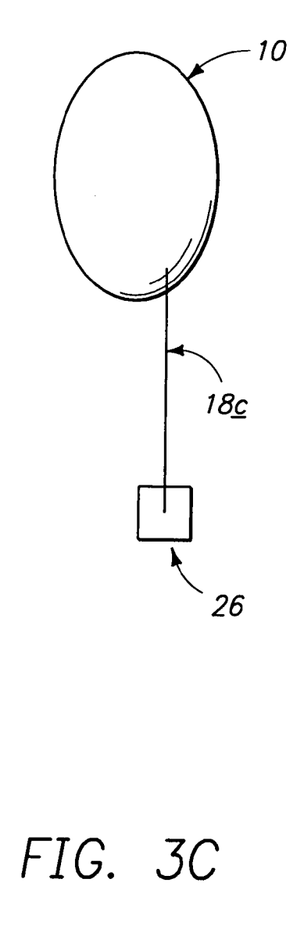
FIG. 3c is a diagram of a pointing device in third mode according to an embodiment of this invention.

Referring to FIG. 3, pointing device 10 can be operated in a plurality of modes. A first mode is shown in FIG. 3a where a relatively large portion of cable 18 is external to pointing device 10 (shown as portion 18a) and thus is available to the user. In this mode (operational), pointing device 10 is connected to display 14 or computer 12 via connector 26 in a typical office or home environment. A second mode is shown in FIG. 3b where a small to non-existent portion of cable 18 is external to pointing device 10 (shown as portion 18b). In this mode (storage), pointing device 10 is not connected to computer 12 or display 14 and a substantial portion of cable 18 is wrapped around cable receiver 24 (not shown). A third mode (intermediate) is shown in FIG. 3c, where an intermediate portion of cable 18 is external to pointing device 10 (shown as portion 18c) and thus available to the user. In this mode, pointing device 10 is typically connected to display 14 or computer 12 via connector 26. The third mode is typically used in an environment where space may be at a premium (airplane, train, hotel room etc.) and computer 12 or display 14 is in close proximity to pointing device 10.

Figure 4A:
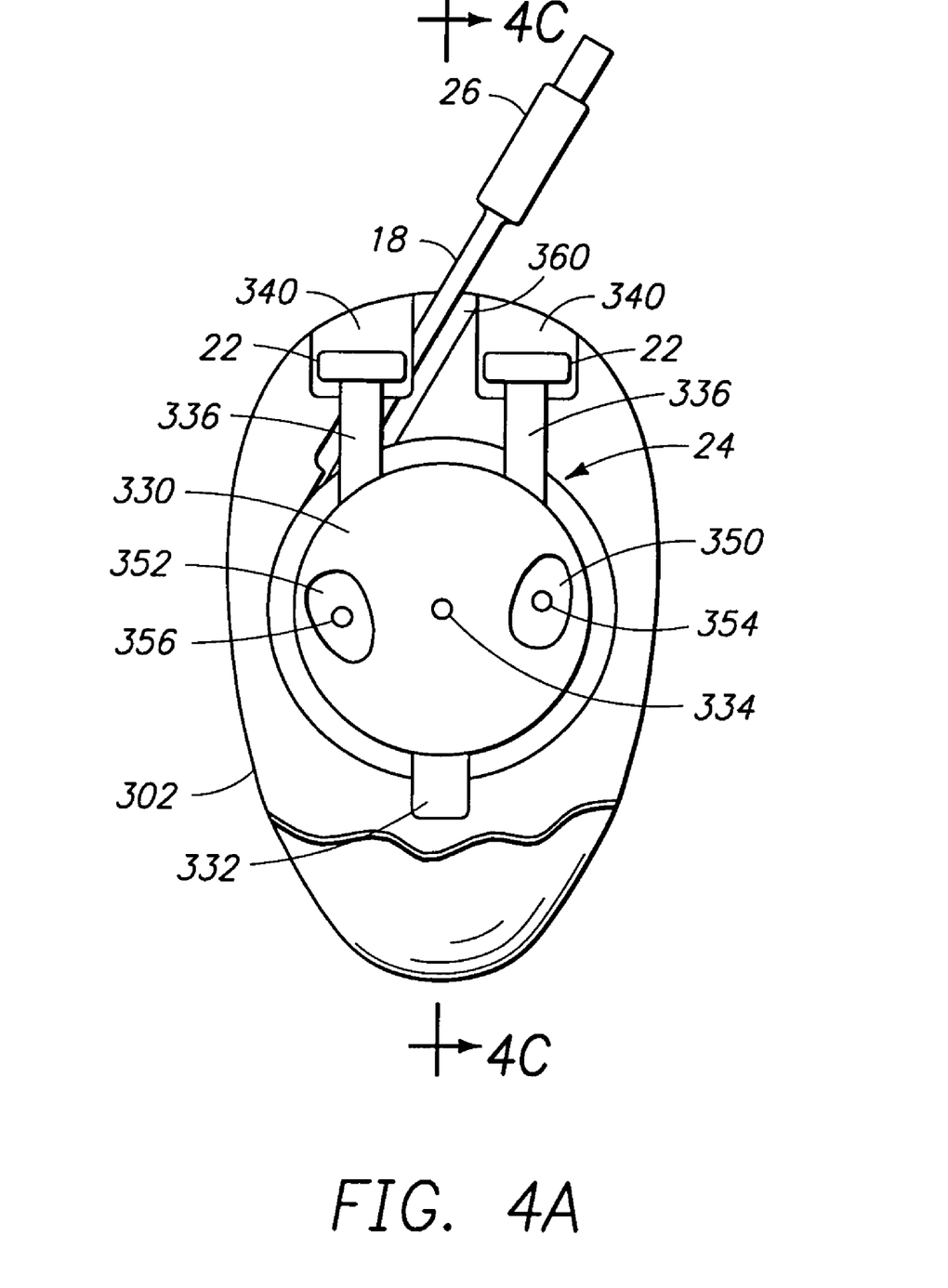
FIG. 4a is a top view of a pointing device according to an embodiment of this invention.

Referring to FIG. 4a, an embodiment of pointing device 10 of the present invention in a top view with the cover removed is shown, where cable receiver 24 is rotatably mounted to base 302 through spindle 334 and spindle bracket 332. Note that in contrast to the two spool system shown in FIG. 1 cable receiver 24 is a single spool. Further in contrast to the two spool system all but a small portion of cable 18 is continuously wound or unwound from the single spool of cable receiver 24. A small portion of cable 18 is typically used to connect to tracking device 20. Cable 18 is shown partially wound around cable receiver 24. When cable 18 is fully wound around cable receiver 24, connector 26 is housed in connector receiver 360. FIG. 4a also shows rotatable disk 330 affixed to shaft 334 which is affixed to cable receiver 24 such that when rotatable disk 330 is rotated, cable receiver 24 is also rotated. A top view of rotatable disk 330 is shown in FIG. 4a in which depressions 350 and 352 are formed into the exterior surface of the top of rotatable disk 330. Depressions 350 and 352 are preferably approximately the size and shape of an average finger, but could be other shapes and sizes. The user places their finger in one of these depressions to rotate rotatable disk 330 to wind and unwind cable 18. In addition, two smaller apertures 354 and 356 are also formed into the center of depressions 350 and 352 respectively. Apertures 354 and 356 are approximately the size of a typical ball point pen tip or the tip of a typical stylus used with various personal digital assistants. The user can place either a ball point pen tip, pencil tip, stylus tip or any other suitable instrument into either circular depressions 354 or 356 to rotate rotatable disk 330 to wind and unwind cable 18.

FIG. 4a also shows switches 22 mounted on switch brackets 340. In this embodiment, the majority of cable 18 is capable of being external to pointing device 10, where majority is defined as greater than 50%. In the preferred embodiment, 85%–95% of cable 18 is capable of being unwound and external to pointing device 10. This is in sharp contrast with the prior art where less than 50% of the cable is capable of being unwound and external to the computer mouse. FIG. 4a also shows connector 26 attached to one end of cable 18. In this embodiment, the other end of cable 18 is attached to tracking device 20. When cable 18 is fully wound around cable receiver 24 connector 26 fits in connector receiver 360.

Figure 4B:
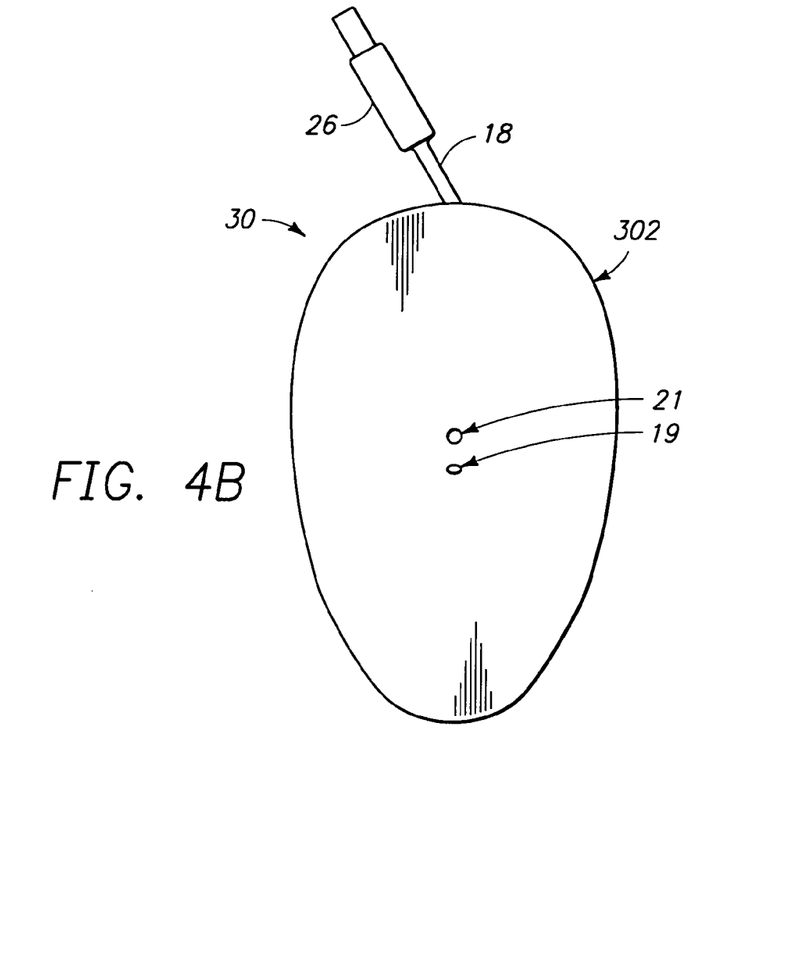
FIG. 4b is a bottom view of an pointing device according to an embodiment of this invention.

In FIG. 4b, a bottom view is shown where base 302 of housing 30 along with lens 21 and LED 19, both part of tracking device 20 are visible. Although a perfectly planar surface is not required for base 302, a substantially planar surface is desired. In this embodiment, base 302 has no openings through the base which would allow dirt or debris to get inside of pointing device 10 when in use, unlike more conventional pointing devices which utilize either opto-mechanical tracking devices or pointing devices with cable winding mechanisms which are accessed from the bottom.

Figure 4C:
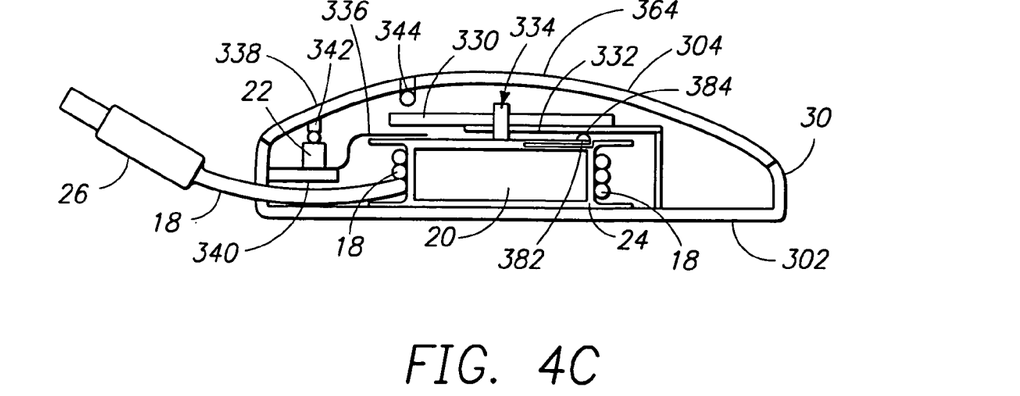
FIG. 4c is a cross-sectional view of an pointing device according to an embodiment of this invention.

FIG. 4c is a planar side view of the embodiment shown in FIGS. 3a–3b, where cover 304 encloses the top of base 302, cover 304 and base 302 make up housing 30 of pointing device 10. Cable receiver 24 is rotatably mounted to housing 30 through spindle 334 and spindle bracket 332. Spindle bracket 332 can extend either from the side or from the bottom of base 302. Cable 18 is shown partially wound around cable receiver 24. Tracking device 20 is integrally housed within cable receiver 24. In this embodiment, both the tracking mechanism and the tracking electronics which make up tracking device 20 are located within cable receiver 24 and are fully rotatable about the axis formed by spindle 334. In this embodiment, tracking device 20 is preferably an optical tracking system as described earlier. FIG. 4c also shows switch 22 mounted on switch bracket 340. Although as shown switch bracket 340 extends from the side of base 302 it is also desirable to have switch bracket 340 extend up from the bottom of base 302 or extend down from cover 304. Switch button 338 is also shown in FIG. 4c which when depressed activates switch 22 through switch activator 342. Switch button 338 together with cover 304 define the top exterior surface of housing 30 of pointing device 10. The connection between switch 22 and cable receiver 24 is made by link 336 through capacitive coupling is also shown in FIG. 4c. An example of such capacitive coupling used to detect the change in state of a switch is described in U.S. Pat. No. 5,414,420.

FIG. 4c also shows rotatable disk 330 affixed to shaft 334 which is affixed to cable receiver 24 such that when rotatable disk 330 is rotated cable receiver 24 is also rotated. Access to rotatable disk 330 is obtained by opening lid portion 364 attached to cover 304 by hinge 344. When lid portion 364 is in an open position the user can wind and unwind cable 18 around cable receiver 24. However, those skilled in the art will appreciate that cable 18 can be wound either manually as shown or optionally spring activated with a latching mechanism. If spring activated, a spring with one end attached to the spool contained in cable receiver 24 and the other end attached to housing 30 such that the latch mechanism acts much like that of a window shade or key chain. To draw out cable 18, the user pulls on cable 18 slowly. To rewind cable 18 the user simply tugs on cable 18 to make the locking latch on the spring activated latching mechanism release. The spring rewinds cable 18 on cable receiver 24 which retracts cable 18 into pointing device 10. Those skilled in the art will appreciate that there are numerous designs that can also be utilized which fall within the scope and spirit of the present invention. Examples would be using a push button (e.g. as on a tape measure) or other manual latching mechanism to activate the rewinding of cable 18. (see U.S. Pat. Nos. 5,422,957 and 5,339,461 for designs of conventional spring wound take up-reels).

Figure 4D:
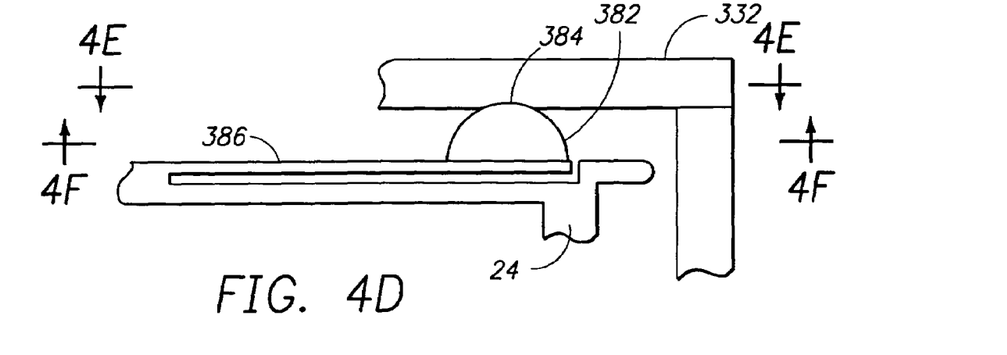
FIG. 4d is an expanded cross-sectional view of the detent and reference stop according to an embodiment of this invention.

FIG. 4c also shows detent 382 attached to cable receiver 24. FIG. 4d is an expanded cross sectional view of detent 382 and reference stop 384, showing detent 382 attached to cable receiver 24 by lever arm 386. Detent 382 mates with reference stop 384 formed in the bottom surface of the top portion of spindle bracket 332. With each complete turn of cable receiver 24 this mating will occur. Thus when detent 382 mates with reference stop 384 the user is provided tactile feedback that a complete revolution of cable receiver 24 has taken place. This in turn provides the user with feedback that tracking device 20 is in proper alignment with housing 30. When tracking device 20 is in proper alignment with housing 30, cursor 16 on display 14 moves in the same direction as the direction the user moves pointing device 10. For example, if the user moves pointing device 10 to the left, cursor 16 will also move to the left on display 14. This embodiment preferably contains reference stop 384 to avoid situations where cursor 16 could move in either unexpected directions or even in the opposite direction to what the user expected.

Lever arm 386 provides the proper tension to ensure detent 382 mates with reference stop 384. Those skilled in the art will readily recognize that the length, width, and thickness of lever arm 386 to a large degree control the tension or force detent 382 will exert on reference stop 384. Those skilled in the art will also readily recognize that as the size and depth of reference stop 384 increases the degree of tactile feedback also increases.

Figure 4E:
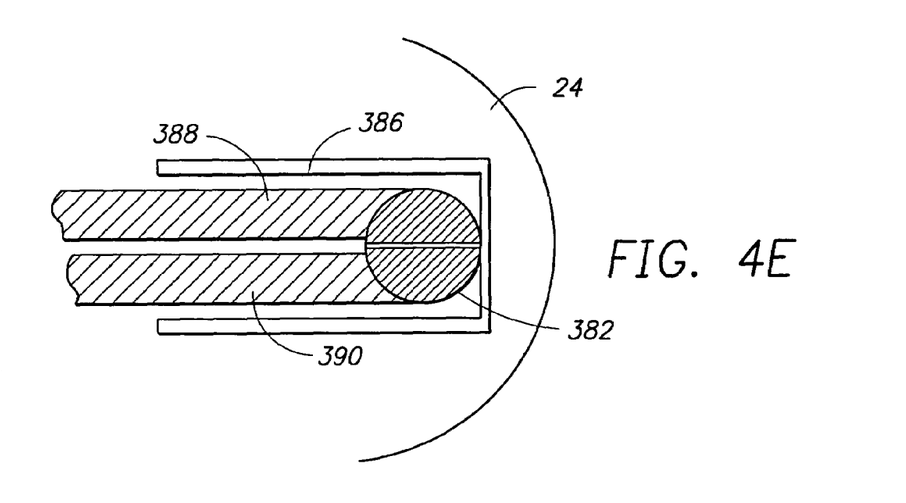
FIG. 4e is a top view of the detent according to an embodiment of this invention.
Figure 4F:
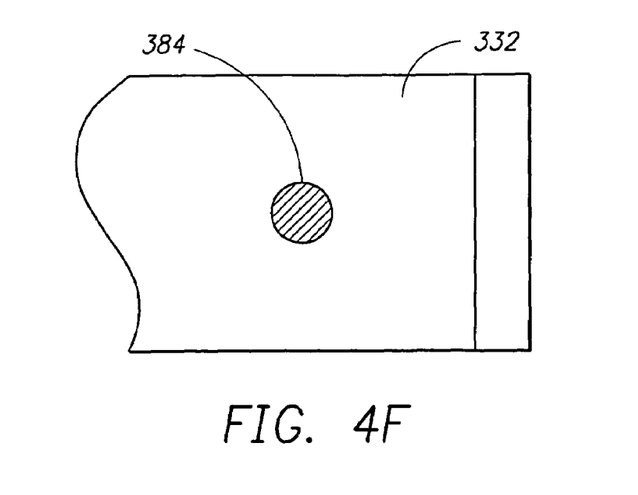
FIG. 4f is a bottom view of the reference stop according to an embodiment of this invention.

FIG. 4e is a top view of lever arm 386 showing two adjacent electrically conductive strips 388, 390. Each strip extends along the length of lever arm 386 and continues over the substantially hemispherically shaped detent 382. Reference stop 384 as shown in FIG. 4f also contains a conductive film covering the inner substantially hemispherically shaped surface of reference stop 384. When detent 382 is not mated with reference stop 384 there is no electrical connection between conductive strip 388 and conductive strip 390, acting as an open state in which pointing device 10 will either not operate or provide some other visual indicator on display 14 indicating to the user that cable receiver 24 is not aligned properly with housing 30. When detent 382 is mated with reference stop 384 there is electrical connection between conductive strip 388 and conductive strip 390 putting pointing device 10 in a closed (operational) state. The circuit components for processing this switch state information are mounted on cable receiver 24. By incorporating a switch in detent 382 and reference stop 384 the user is provided not only with tactile feedback when winding and unwinding cable 18 but also visual feedback on display 14 when tracking device 20 is not properly aligned with housing 30.

Figure 5A:
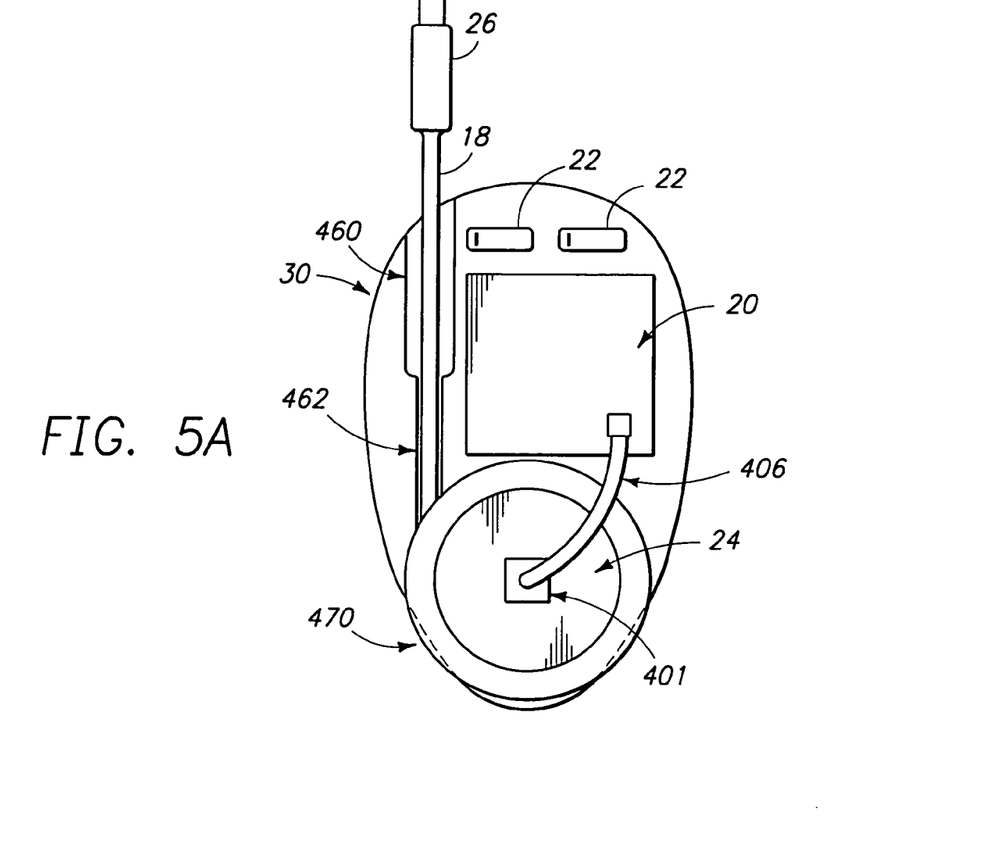
FIG. 5a is a top view of a pointing device according to an embodiment of this invention.

FIG. 5a shows an alternate embodiment of the present invention where rotary connector 401 is mounted to cable receiver 24 thereby providing the rotatable mounting necessary for cable receiver 24 to operate and the separation of tracking device 20 and switches 22 from cable receiver 24. In this embodiment, tracking device 20 can be any one of the mechanical, opto-mechanical or optical tracking devices described earlier. Rotary connector 401 provides the capability of maintaining electrical coupling at a fixed point not on cable receiver 24 and still enable cable 18 windability. Also shown in FIG. 5a is connecting cable 406 which connects rotary connector 401 with tracking device 20. In this embodiment access to cable receiver 24 is provided by thumb wheel 470 shown in both FIGS. 5a and 4b. Thumb wheel 470 is securely attached to cable receiver 24 such that when thumb wheel 470 is rotated cable receiver 24 is also rotated providing the ability to wind and unwind cable 18 from cable receiver 24. Thumb wheel 470 protrudes through two slots in the side of base 302. FIG. 5a also shows connector receiver 460 formed into base 302, which accepts connector 26 for use in the storage configuration. To help guide cable 18 during winding and unwinding, cable guide 462 is also formed into base 302 as shown in FIG. 5a.

Figure 5B:
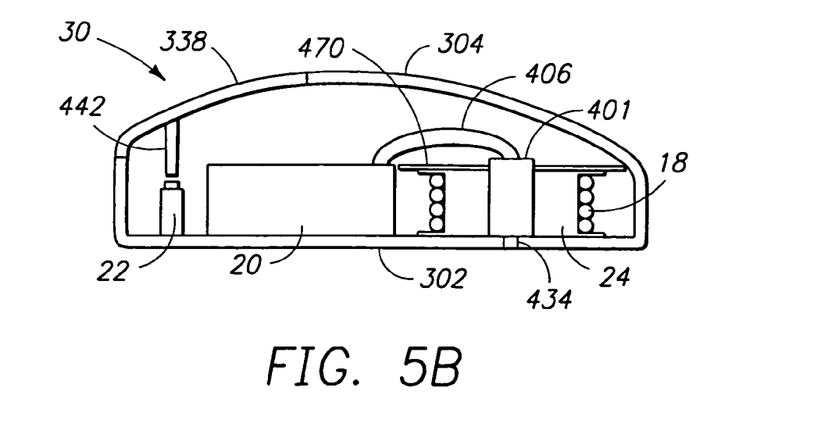
FIG. 5b is a cross-sectional view of a pointing device according to an embodiment of this invention.

FIG. 5b is a planar cross-sectional view of the embodiment shown in FIG. 4a where tracking device 20 and switch 22 are mounted to base 302. Although as shown switch 22 is mounted to base 302 it is also desirable to have switch 22 mounted to a switch bracket as shown previously in FIGS. 4a and 4c. Switch button 438 is also shown in FIG. 5b which when depressed activates switch 22 through switch activator 442. Switch button 338 together with cover 304 defines the top exterior surface of housing 30 of pointing device 10. FIG. 5b also shows cable receiver 24 rotatably mounted to base 302 through spindle 434.

Figure 5C:
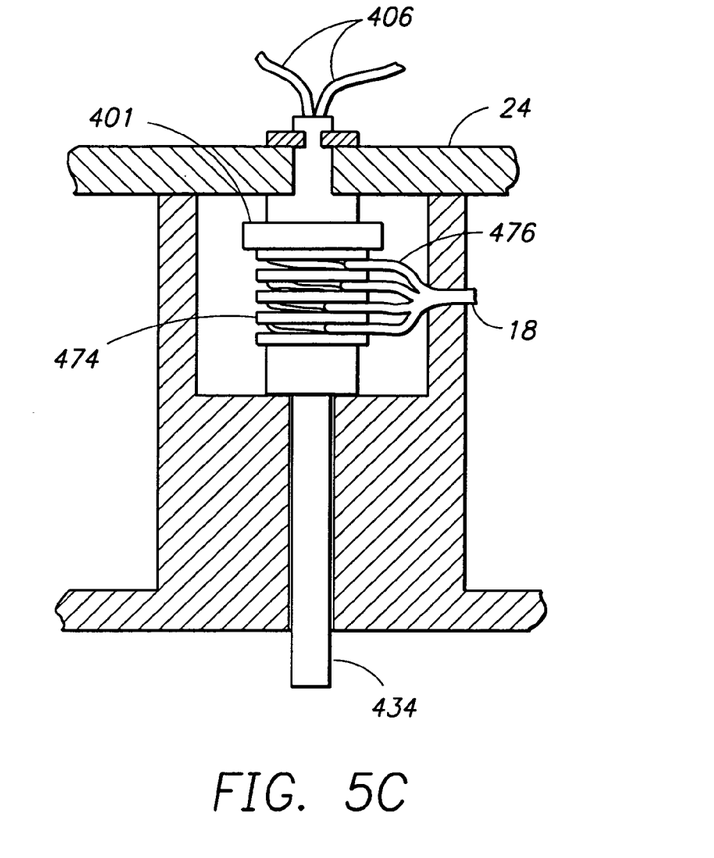
FIG. 5c is a cross-sectional view of a rotary connector according to an embodiment of this invention.

FIG. 5c is a planar cross-sectional view of an embodiment of rotary connector 401 disposed within cable receiver 24. Cable receiver 24 and spindle 434 have a mutual axis of rotation and spindle 434 is affixed to base 302. Cable receiver 24 is rotatably mounted to spindle 434. Disposed around the periphery of spindle 434 are a plurality of electrically conductive rings 474 that are electrically connected to connecting cable 406. Electrically engaging each ring 474 is electrically conductive wiper 476 that is connected to cable 18. Those skilled in the art will appreciate that there are numerous designs of rotary connectors that can also be utilized which fall within the scope and spirit of the present invention.

Figure 5D:
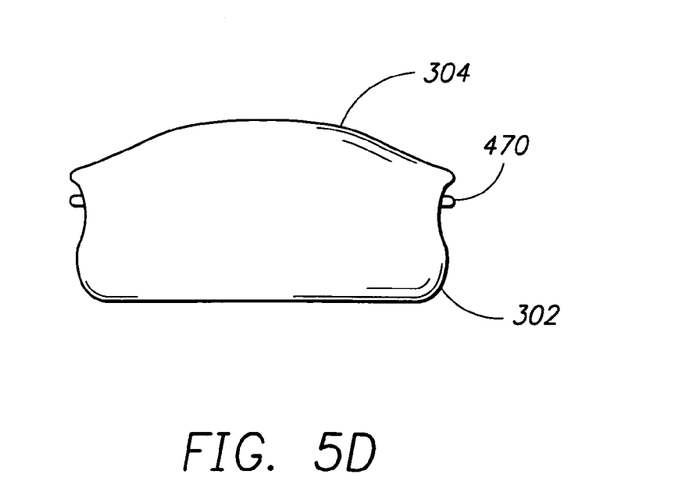
FIG. 5d is an end view of pointing device 10 according to an embodiment of this invention.

FIG. 5d is an end view of pointing device 10 according to the embodiment shown in FIGS. 4a–b, showing thumb wheel 470 protruding through two slots in the side of base 302, allowing the user to wind and unwind cable 18.

Figure 6A:
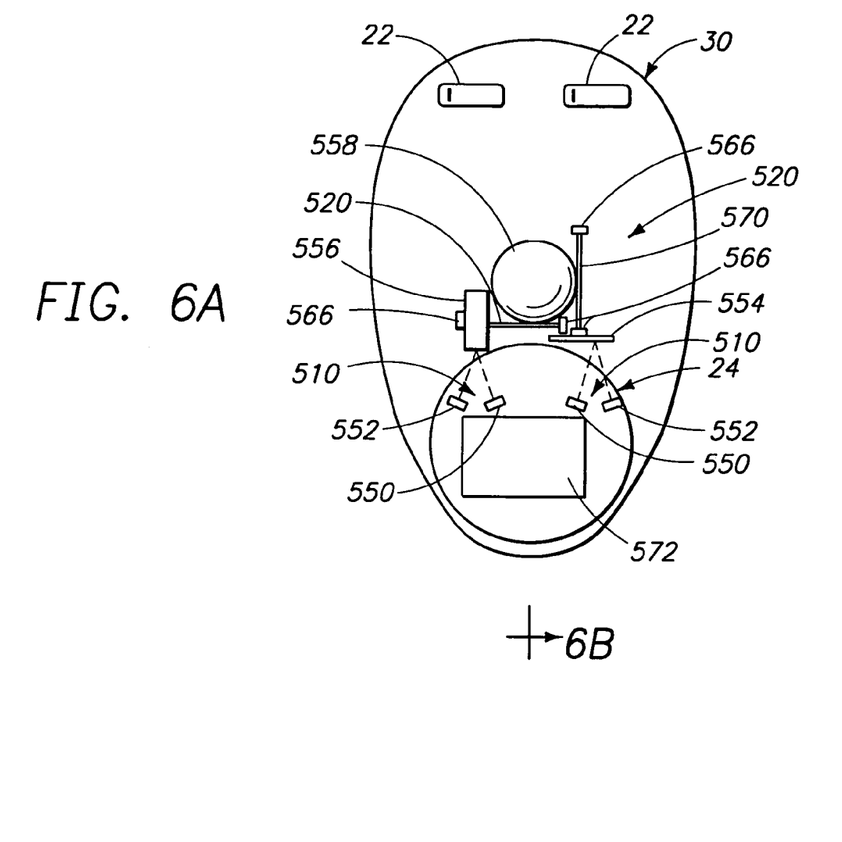
FIG. 6a is a top view of a pointing device according to an embodiment of this invention.
Figure 6B:
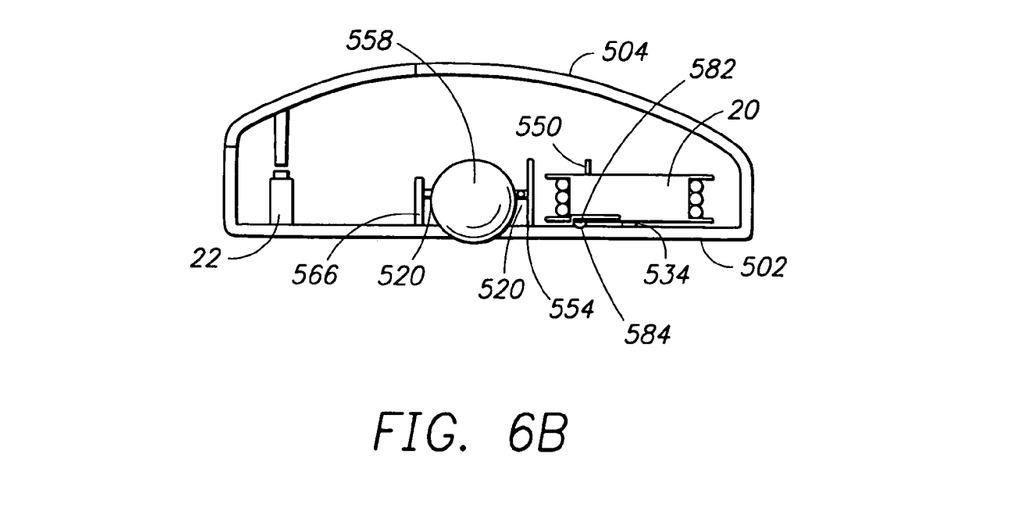
FIG. 6b is a cross-sectional view of a pointing device according to an embodiment of this invention.
Figure 6C:
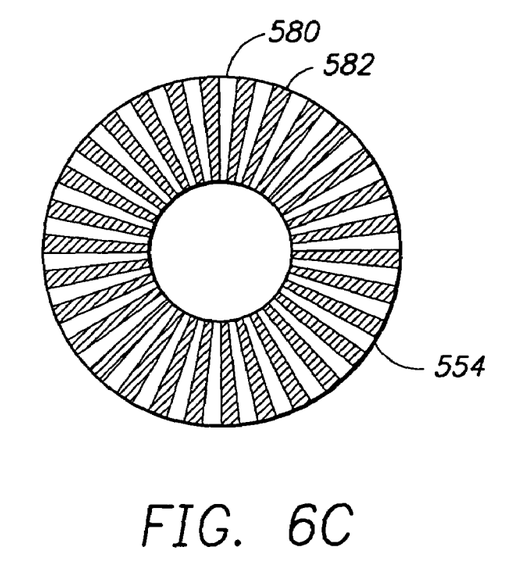
FIG. 6c is a face view of an encoder wheel according to an embodiment of this invention.
Figure 6D:
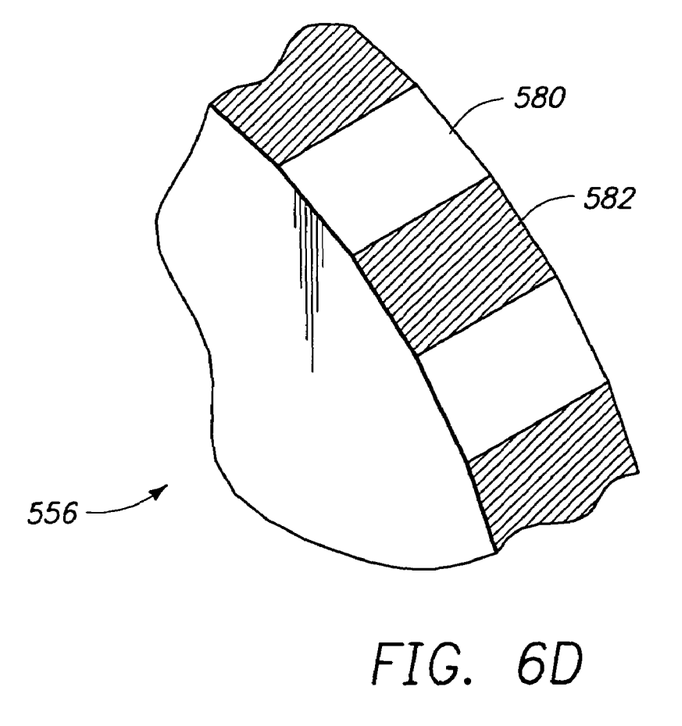
FIG. 6d is an enlarged view of an encoder wheel according to an embodiment of this invention.

FIG. 6a shows an alternate embodiment of the present invention where two transducers 510 are mounted on cable receiver 24 and tracking mechanism 520 is disposed within base 302 not attached to cable receiver 24. Cable 18 is connected to rotatable control circuit 572. Control circuitry on rotatable control circuit 572 processes the signal output by transducers 510 and then sends either to computer 12 or directly to display 14 signals controlling the direction and distance of cursor 16 movement on display 14. FIG. 6b shows detent 582 attached to cable receiver 24. Detent 582 mates with reference stop 584 formed in the inside surface of base 502. As mentioned in an earlier embodiment, detent 582 and reference 584 ensure that transducers 510 are in proper alignment with tracking mechanism 520 and housing 30. Encoder wheels 520 and 556 are axially mounted on encoder shafts 520 and 522 respectively which are rotatably supported by shaft supports 566. Preferably, shaft supports 566 extend upwardly from the interior bottom surface of base 302. Encoder wheels 554 and 556 and encoder shafts 520 and 522 are preferably formed together as single parts. Encoder shafts 520 and 522 are positioned perpendicular to each other within housing 30 and adjacent to ball 558. As ball 558 rotates, encoder shafts 520 and 522 rotate accordingly. The face of encoder wheel 554 is shown in FIG. 6c showing alternating reflective and non-reflective surfaces. An expanded perspective view showing the polygonal edge surface made up of n flat surfaces, where n typically is greater than 20 is shown in FIG. 6d. The greater the number n, the smaller the increments of both the direction of travel and the magnitude of travel of pointing device 10 can be distinguished. Preferably n=50 to 70, although n could be smaller or larger.

Transducers 510 as shown in FIG. 6a, each include a paired light-emitting element or LED 550 and light-detecting element or photodetector 552. Unlike more common electro-mechanical tracking devices which use encoder wheels that alternately transmit and then block light from LEDs 550 to photodetector 552, the embodiment of the present invention shown in FIGS. 5a–5b uses encoder wheels 554 and 556 to alternately reflect and not reflect light from LEDs 550 to photodetector 552. This use of reflected light rather than transmitted light allows transducers 510 to rotate on cable receiver 24. As encoder wheel 554 rotates, light from LED 550 alternately reflects and does not reflect off the face of encoder wheel 554 as reflective segments 580 and then non-reflective segments 582 sweep buy creating light pulses that photodetectors 552 convert into electrical pulse signals. Those skilled in the art will appreciate that there are numerous ways to create both reflective segments 580 and non-reflective segments 582. Preferably reflective segments 580 are made from a metal coating and non reflective segments 582 are made from slots formed in encoder wheel 554. Another example for reflective segment 580 would be multilayer non-metallic reflective coatings. Other examples for non-reflective segments 582 would be absorbing surfaces such as black or diffuse rough surfaces or some combination thereof.

As encoder wheel 556 rotates, light from LED 550 alternately reflects and does not reflect off the edge surface of encoder wheel 556 as reflective segments 580 and non-reflective segments 582 sweep by the light from LED 550. Those skilled in the art will appreciate that there are numerous ways to create both reflective segments 580 and non-reflective segments 582 for encoder wheel 556 and fall within the spirit and scope of the present invention. Preferably, reflective segments 580 are flat surfaces coated with a highly reflective metallic coating while non-reflective segments 582 are a roughened black surface which absorbs the majority of light and diffuses any remaining reflected light. Another example for reflective segments 580 would be multilayer non-metallic reflective coatings. Other examples for non-reflective segments 582 would be either a black surface or a roughened surface by themselves or a spoked wheel arrangement where there is no outer rim holding the spokes together.

Those skilled in the art will also readily recognize that various mechanical coupling schemes can be utilized to produce encoder wheels that are not directly attached to encoder shafts 520 and 522. It is also readily apparent to those skilled in the art that the same or similar mechanical coupling schemes can be utilized to produce encoder wheels which either both use the face surface or edge surface for reflection rather than the mutually perpendicular encoder wheels shown in the embodiment shown in FIGS. 6a–6b

What is claimed is:

1. A pointing device capable of changing the appearance of a display, comprising:
   a housing having a cover and a base;
   a single spool cable receiver rotatably mounted to the housing;
   a cable having a first end and a second end with the second end mounted to the cable receiver; and
   a tracking device having at least one component of the tracking device disposed on or within the cable receiver, wherein the tracking device generates signals based on movement of the pointing device, wherein the pointing device has a first mode with a first portion of the cable having a first length external to the pointing device and a second portion of the cable wound around the cable receiver; and a second mode with the first portion of the cable having a second length external to the pointing device less than the first length.

2. The pointing device of claim 1, wherein the pointing device has a third mode with a third portion of the cable having a third length external to the pointing device less than the first length and greater than the second length.

3. The pointing device of claim 1, further comprising a switch to generate a pointing signal to the display.

4. The pointing device of claim 3, wherein the switch further comprises a link having a conductor portion capacitively coupled to the cable receiver.

5. The pointing device of claim 1, wherein the tracking device further comprises an optical tracking device including a sensor, a lens, and a light source, wherein the optical tracking device optically tracks movement of the pointing device.

6. The pointing device of claim 1, further comprising:
   a reference stop surface disposed in the housing; and
   a detent disposed in the housing, the detent having a mating surface to the reference stop surface, wherein when the detent mates with the reference stop surface, providing tactile feedback, the tracking device is in proper alignment with the housing, and when the detent does not mate with the reference stop surface the tracking device is not in proper alignment with the housing.

7. The pointing device of claim 6, wherein said detent further comprises an electrical switch.

8. The pointing device of claim 1, wherein the cable is shielded.

9. The pointing device of claim 1, wherein the cover further comprises a lid having an open position providing access to the cable receiver and the lid having a closed position covering the cable receiver.

10. The pointing device of claim 9, further comprising:
    a rotatable disk affixed to the cable receiver, the rotatable disk having a disk top including an exterior surface, further comprising:
    a depression formed in the exterior surface of the disk top, the depression having a diameter, and adapted to accept a finger, and
    an aperture within the depression less than the diameter of the depression.

11. The pointing device of claim 1, further comprising:
    a connector attached to the cable at the first end; and
    a connector receiver formed in the housing which accepts the connector.

12. The pointing device of claim 1, wherein the tracking device further comprises:
    a mechanical motion transfer mechanism disposed in the housing; and
    a rotatable control circuit having at least one transducer disposed on or within the cable receiver, and converting movement of the mechanical motion transfer mechanism into position signals in response to movement of the housing.

13. The pointing device of claim 12, wherein the rotatable control circuit further comprises first and second transducers converting movement of the mechanical motion transfer mechanism into first and second position signals in response thereto.

14. The pointing device of claim 13, wherein the mechanical motion transfer mechanism further comprises:
    a first wheel with a polygonal edge surface rotatably mounted relative to the housing; and
    a second wheel rotatably mounted relative to the housing, wherein the first transducer is operably coupled to the first wheel producing the first position signal and the second transducer is operably coupled to the second wheel producing the second position signal in response to rotation of the first and second wheels in response to movement of the housing.

15. The pointing device of claim 14, wherein the polygonal edge surface further comprises n flat reflective surfaces, wherein n is greater than 20.

16. The pointing device of claim 14, wherein the second wheel further comprises an encoder wheel having alternating reflective and non-reflective surfaces on a face surface of the encoder wheel.

17. the pointing device of claim 14, wherein the first wheel operably couples to the first transducer utilizing reflected light and the second wheel operably couples to the second transducer utilizing reflected light.

18. The pointing device of claim 1, further comprising:
    a rotatable disk mounted to the cable receiver; and
    a slot in the housing, wherein the rotatable disk protrudes through the slot.

19. The pointing device of claim 1, further comprising:
    a reference stop surface fixedly coupled to the housing; and
    a detent disposed on the cable receiver, the detent having a mating surface to the reference stop surface, wherein when the detent mates with the reference stop surface, providing tactile feedback, the tracking device is in proper alignment with the at least one electrical component of the tracking device disposed on or within the cable receiver, and when the detent does not mate with the reference stop surface the tracking device is not in proper alignment with cable receiver.

20. A system, comprising:
    a computer;
    a display electrically coupled to the computer; and
    a pointing device, wherein the pointing device is capable of changing the appearance of the display, the pointing device further comprising:
    a housing having a cover and a base,
    a single spool cable receiver rotatably mounted to the housing,
    a cable having a first end and a second end with the second end mounted to the cable receiver, and
    a tracking device having at least one component of the tracking device disposed on or within the cable receiver, wherein the tracking device generates signals based on movement of the pointing device, the signals controlling movement of a reference on the display;

wherein the pointing device has a first mode with a first portion of the cable having a first length external to the pointing device and a second portion of the cable wound around the cable receiver; and a second mode with the first portion of the cable having a second length external to the pointing device less than the first length.

21. A system, comprising:
a computer;
a display coupled to the computer; and
a pointing device, wherein the pointing device is capable of changing the appearance of the display, the pointing device further comprising:
a housing having a cover and a base,
a cable receiver rotatably mounted to the housing,
a cable having a first end and a second end with the second end mounted to the cable receiver, and
an optical tracking device having at least one optical component disposed within the cable receiver, the optical tracking device including a sensor, a lens, and a light source, wherein the tracking device generates signals based on movement of the pointing device, the signals controlling movement of a reference on the display;
wherein the pointing device has a first mode with a first portion of the cable having a first length external to the pointing device and a second portion of the cable wrapped around the cable receiver; and a second mode with the first portion of the cable having a second length external to the pointing device less than the first length.

22. A system, comprising:
a computer;
a display coupled to the computer; and
a pointing device, wherein the pointing device is capable of changing the appearance of the display, the pointing device further comprising:
a housing having a cover and a base,
a cable receiver rotatably coupled to the housing,
a cable having a first end and a second end with the second end mounted to the cable receiver; and
an optomechanical tracking device disposed in the housing,
further comprising:
a mechanical motion transfer mechanism, and
a rotatable control circuit having at least one transducer disposed on the cable receiver converting movement of the mechanical motion transfer mechanism into position signals in response to movement of the housing;
wherein the pointing device has a first mode with a first portion of the cable having a first length external to the pointing device and a second portion of the cable wrapped around the cable receiver; and a second mode with the first portion of the cable having a second length external to the pointing device less than the first length.

23. A method for storing a cable with a connector in a pointing device housing containing a cable receiver with a connector receiver and the connector coupled to a computer, comprising the steps of:
disconnecting the cable from a computer;
opening a lid disposed on the housing of the pointing device;
providing access to a rotatable disk attached to the cable receiver;
rotating the rotatable disk to wind the cable around the cable receiver;
inserting the connector into the connector receiver; and
closing the lid.

24. The method of claim 23, wherein the winding step further comprises the step of inserting a stylus into an aperture and rotating the rotatable disk to wind the cable around the cable receiver.

25. A pointing device capable of changing the appearance of a display comprising:
a housing having a cover and a base;
a single spool cable receiver rotatably mounted to the housing;
a cable having a first end and a second end with the second end mounted to the cable receiver;
a switch capacitively coupled to the cable receiver wherein the switch generates a pointing signal to the display;
a detent wherein the detent aligns the cable receiver to the housing;
a connector attached to the cable at the first end;
a connector receiver formed in the housing which accepts the connector;
a lid, wherein the lid is disposed in an open position when the cable is being wound around the cable receiver, and the lid is disposed in a closed position when covering the cable receiver;
a rotatable disk affixed to the cable receiver, the rotatable disk having a disk top including an exterior surface further comprising:
a depression formed in the exterior surface of the disk top, the depression having a diameter, and
an aperture within the depression less than the diameter of the depression; and
a tracking device mounted to the cable receiver, the tracking device having an optical sensor for generating signals based on movement of the pointing device, the signals controlling the movement of a reference on the display, wherein the pointing device has a first mode with a first portion of the cable having a first length external to the pointing device and a second portion of the cable wound around the cable receiver; and a second mode with the first portion of the cable having a second length external to the pointing device less than the first length.

26. A pointing device capable of changing the appearance of a display comprising:
a housing having a cover having an opening and a base;
a single spool cable receiver rotatably mounted to the housing;
a cable having a first end and a second end with the second end mounted to the cable receiver;
a switch capacitively coupled to the cable receiver wherein the switch generates a pointing signal to the display;
a detent wherein the detent aligns the cable receiver to the housing;
a connector attached to the cable at the first end;
a connector receiver formed in the housing which accepts the connector;
a rotatable disk affixed to the cable receiver, and disposed within the opening in the cover;
a tracking device mounted to the cable receiver, comprising:
a rotatable control circuit mounted to the cable receiver for producing position signals in response to movement of the housing, the rotatable control circuit having first and second transducers for receiving user commands indicating movement of the housing and producing first and second position signals in response thereto;

a tracking mechanism disposed in the housing coupled to the rotatable control circuit for generating signals in response to movement of the housing, further comprising:

a first wheel having a polygonal edge surface, the first wheel rotatably mounted to the housing, and a second wheel rotatably mounted relative to the housing, wherein the first transducer is operably coupled to the first wheel producing a first signal and the second transducer is operably coupled to the second wheel producing a second signal in response to rotation of the first and second wheels in response to movement of the housing;

wherein the pointing device has a first mode with a first portion of the cable having a first length external to the pointing device and a second portion of the cable wound around the cable receiver; and a second mode with the first portion of the cable having a second length external to the pointing device less than the first length.

27. A pointing device, comprising:
a housing;
a cable receiver rotatably mounted to the housing;
　a cable having a first end and a second end with the second end mounted to the cable receiver; and
　a tracking device having all electrical components of the tracking device disposed on or within the cable receiver, wherein the tracking device generates signals based on movement of the housing, wherein the cable is alternately manually wound or unwound from the cable receiver between a first length and a second length external to the housing.

28. A pointing device, comprising:
housing;
a cable receiver rotatably mounted to the housing;
　a cable having a first end and a second end with the second end mounted to the cable receiver; and
　an optical tracking device having only optical components, the tracking device disposed on or within the cable receiver, wherein the tracking device generates signals based on movement of the housing, wherein the cable is alternately manually wound or unwound from the cable receiver between a first length and a second length external to the housing.

* * * * *